(12) United States Patent  (10) Patent No.: US 8,111,255 B2
Park  (45) Date of Patent: Feb. 7, 2012

(54) MOBILE COMMUNICATION TERMINAL FOR CONTROLLING DISPLAY INFORMATION

(75) Inventor: Yeon Woo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 954 days.

(21) Appl. No.: 12/111,004

(22) Filed: Apr. 28, 2008

(65) Prior Publication Data

US 2008/0266289 A1 Oct. 30, 2008

(30) Foreign Application Priority Data

Apr. 27, 2007 (KR) ........................ 10-2007-0041185

(51) Int. Cl.
*G06T 15/00* (2011.01)
*G06F 3/00* (2006.01)
(52) U.S. Cl. ....................................... 345/419; 715/700
(58) Field of Classification Search .................. 345/419; 715/700
See application file for complete search history.

(56) References Cited

U.S. PATENT DOCUMENTS

| 5,712,968 | A * | 1/1998 | Nakayama et al. | 714/4.4 |
| 5,898,430 | A * | 4/1999 | Matsuzawa et al. | 715/204 |
| 6,326,988 | B1 * | 12/2001 | Gould et al. | 715/850 |
| 6,466,237 | B1 * | 10/2002 | Miyao et al. | 715/838 |
| 6,597,358 | B2 * | 7/2003 | Miller | 345/427 |
| 7,096,453 | B2 * | 8/2006 | Dionne et al. | 717/105 |
| 2003/0142136 | A1 * | 7/2003 | Carter et al. | 345/782 |
| 2003/0156146 | A1 * | 8/2003 | Suomela et al. | 345/864 |
| 2004/0199871 | A1 * | 10/2004 | Lee | 715/513 |
| 2006/0069698 | A1 * | 3/2006 | Hintikka | 707/102 |
| 2006/0143327 | A1 * | 6/2006 | Hsieh et al. | 710/18 |
| 2006/0156228 | A1 * | 7/2006 | Gallo et al. | 715/523 |
| 2006/0274060 | A1 * | 12/2006 | Ni et al. | 345/419 |
| 2008/0186305 | A1 * | 8/2008 | Carter | 345/419 |
| 2008/0243778 | A1 * | 10/2008 | Behnen et al. | 707/3 |
| 2009/0019393 | A1 * | 1/2009 | Fukushima et al. | 715/810 |

FOREIGN PATENT DOCUMENTS

WO 01/69367 9/2001

* cited by examiner

*Primary Examiner* — Xiao M. Wu
*Assistant Examiner* — David T Welch
(74) *Attorney, Agent, or Firm* — Lee, Hong, Degerman, Kang & Waimey

(57) ABSTRACT

A mobile communication terminal and a method of controlling display of a webpage thereof are disclosed. When a web browser is initiated to gain access to a webpage, the web browser screen is formed as a 3D polyhedron structure and a plurality of webpage screens are displayed on a plurality of facets of the 3D polyhedron structure. Therefore, a user is provided with various webpage screens on the web browser. Since different webpage screens are displayed on the plurality of facets of the polyhedron structure, the user is able to access a desired webpage screen easily in a single step.

22 Claims, 14 Drawing Sheets

(a)  (b)

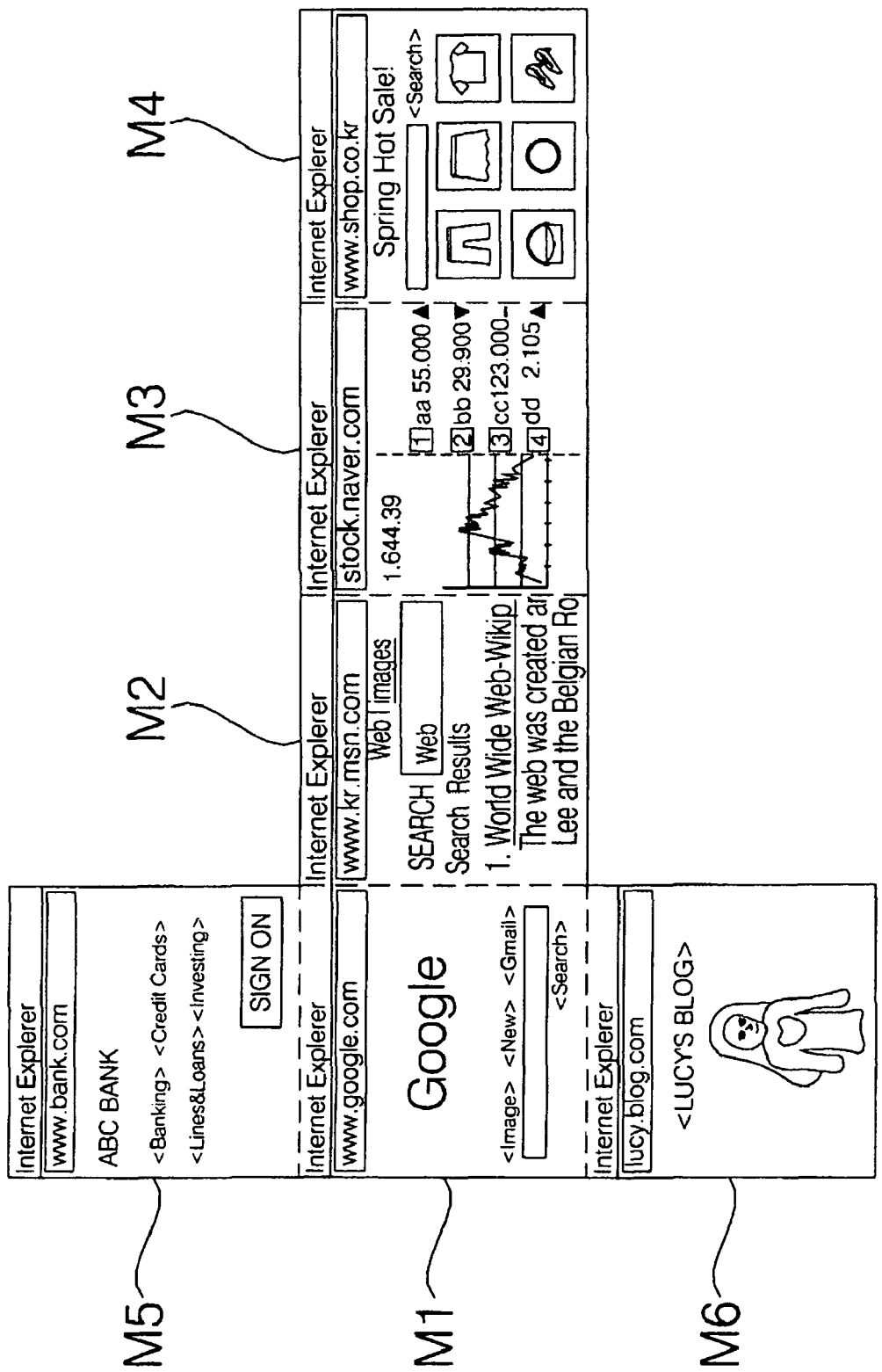

MOBILE COMMUNICATION TERMINAL FOR CONTROLLING DISPLAY INFORMATION

CROSS-REFERENCE TO RELATED APPLICATION

Pursuant to 35 U.S.C. §119(a), this application claims the benefit of earlier filing date and right of priority to Korean Application No. 2007-0041185, filed on Apr. 27, 2007, the contents of which are hereby incorporated by reference herein in their entirety.

FIELD OF THE INVENTION

The present invention relates to a mobile communication terminal and a method of controlling a webpage displayed on the mobile communication terminal, in which different webpage screens are displayed on a web browser screen in a form of a three-dimensional (3D) polyhedron structure.

DISCUSSION OF RELATED ART

In general, upon execution of the web browser, the mobile communication terminal displays a webpage screen provided from an accessed website and accesses or move to another webpage or website according to a command received from a user. Therefore, the mobile communication terminal can gain access to only one webpage or website at a time.

In order to gain reaccess to a webpage or website that was previously accessed, an additional input must be input or the previously accessed webpage or website can be accessed again only through a command such as "move to the previous page".

In order to reaccess a webpage displayed just before a currently displayed webpage, a "move back" command may be executed to go back to the previous page. However, in order to access a webpage displayed a number of pages before the currently displayed webpage, a plurality of corresponding commands or the "move back" commands must be executed repeatedly until a corresponding webpage is reached and displayed.

SUMMARY OF THE INVENTION

An embodiment of the present invention is to provide a method of controlling display information in a wireless mobile terminal and the method includes displaying a polyhedron structure on a display wherein the polyhedron structure includes a plurality of facets, each facet configured to display content obtained from remote servers and rotating the polyhedron structure in a direction associated with a first external user input to display a different facet of the polyhedron structure. In one aspect of the present invention, the method may also include displaying at least part of content information from a single facet of the polyhedron structure in response to a second external user input.

Preferably, each facet of the polyhedron structure is associated with corresponding number and is user selectable by inputting a number and the plurality of facets display contents from a plurality of web sites. More preferably, the location of the web sites with respect to facets of the polyhedron is based on frequency of web site visits or user defined.

Preferably, the plurality of facets display contents based on information type. Alternatively, the plurality of facets may display contents from different sections of the same web page. Alternatively, the plurality of facets may display corresponding numbers and a facet may be selected in response to a second external user input that includes selecting a number.

In another aspect of the present invention, the method may also include displaying an unfolded view of the polyhedron to display contents from all facets of the polyhedron. Preferably, the first external user input is recognized using a touch screen.

In yet another aspect of the present invention, the method may further include displaying a facet information list associated with content displayed on all facets to provide information about facets not viewable from a current perspective view. Each item of the facet information list may be alterable by a user.

Another embodiment of the present invention is to provide a mobile terminal for controlling display information and the method includes a display unit configured to display information, a controller configured to display a polyhedron structure on a display wherein the polyhedron structure comprises a plurality of facets, each facet configured to display content obtained from remote servers, and an external input interface operatively connected to the controller to recognize a user input. Preferably, the controller is further configured to rotate the polyhedron structure in a direction associated with the user input to display a different facet of the polyhedron structure.

In one aspect of the present invention, the controller may be further configured to display at least part of content information from a single facet of the polyhedron structure in response to a second external user input. Preferably, each facet of the polyhedron structure is associated with corresponding number and is user selectable by inputting a number.

In another aspect of the present invention, the controller displays on the plurality of facets contents from a plurality of web sites or contents based on information type. Alternatively, the controller may display on the plurality of facets contents from different sections of the same web page.

Preferably, the controller displays on the plurality of facets corresponding numbers, and a facet is selected in response to a second external user input that includes selecting a number. The controller may be further configured to display an unfolded view of the polyhedron to display contents from all facets of the polyhedron.

In yet another aspect of the present invention, the first external user input is recognized using a touch screen. Preferably, the location of the web sites with respect to facets of the polyhedron is based on frequency of web site visits or user defined. The controller may be further configured to display a facet information list associated with content displayed on all facets to provide information about facets not viewable from a current perspective view. Each item of the facet information list may be alterable by a user.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
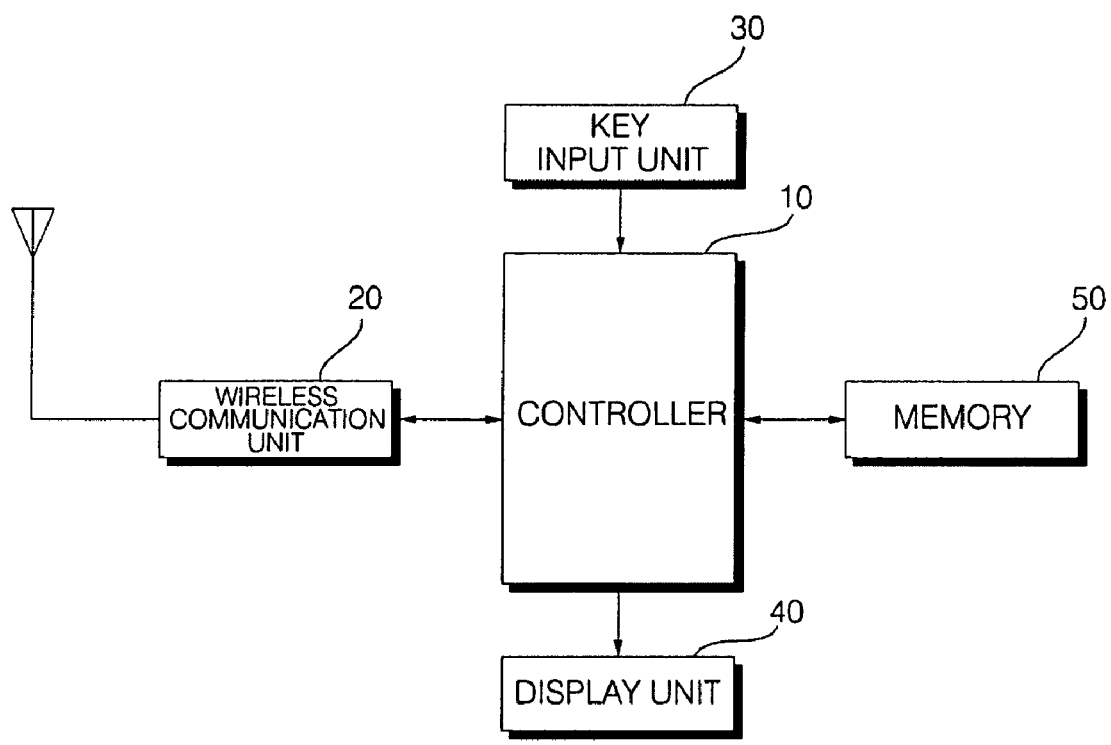
FIG. 1 is a block diagram of a mobile communication terminal in accordance with an embodiment of the present invention.

Referring to FIG. 1, a mobile communication terminal includes a wireless communication unit 20 for transmitting and receiving data, a key input unit 30 to which a user command is input through key manipulation, a display unit 40 through which data is output, memory 50 for storing data, and a controller 10 for controlling an operation of each element.

The wireless communication unit 20 provides an interface for web access. The key input unit 30 is equipped with a plurality of key buttons and applies a control signal, to the controller 10 in response to a user's manipulation of the key button. The key input unit 30 includes at least one of a direction key, a numeric key, or a tab key for selecting any one of facets of a polyhedron.

The display unit 40 is generally formed of an LCD and displays various status data of the mobile communication terminal. The display unit 40 also displays webpage screens, which are provided from websites accessed through the wireless communication unit 20 upon web access. The screen of the display unit 40 may be a touch screen. The memory 50 stores setting data for an operation of the mobile communication terminal and also stores other data, which may be downloaded via the wireless communication unit 20.

When a web browser is executed, the controller 10 controls the web browser screen to display the web browser in a 3D polyhedron structure. The controller 10 controls different webpage screens to display them on a plurality of facets of the 3D polyhedron structure. The different webpage screens displayed on the plurality of facets of the 3D polyhedron structure are classified according to contents, section or frame divided by programming sources of web pages accessed through the wireless communication unit 20, or webpage screens provided from different websites.

The contents include various information types, such as texts, still images, motion images, flash or any combination thereof. The section or frame includes a login region, a search word input region, a header region, and a data region. The different websites include a website previously set by a user or a website selected by the user upon web access.

Further, the controller 10 may be configured to display an unfolded view of the polyhedron structure. The unfolded view of the polyhedron, which displays every facet of the polyhedron, including facets not viewable from a current perspective view of the polyhedron structure, is displayed on a specific region of the display unit 40. Furthermore, when a signal to select a specific screen from the plurality of facets of the polyhedron structure is received, the controller 10 controls the polyhedron structure to move and rotate up and down or left and right so that the selected specific screen is displayed on the display unit 40. The controller 10 controls the polyhedron structure to rotate and move in response to key manipulation of any one of the direction key, the numeric key, and the tab key.

When the specific screen of the facets of the polyhedron is selected, the controller 10 controls the web browser screen of the 3D polyhedron structure to switch to a two-dimensional (2D) screen. Thus, the selected specific screen is displayed in 2D on the display unit 40. When the selected specific screen is displayed, the controller 10 controls the 2D screen to display screen information, such as a page number or a page priority set on the selected screen.

Figure 2:
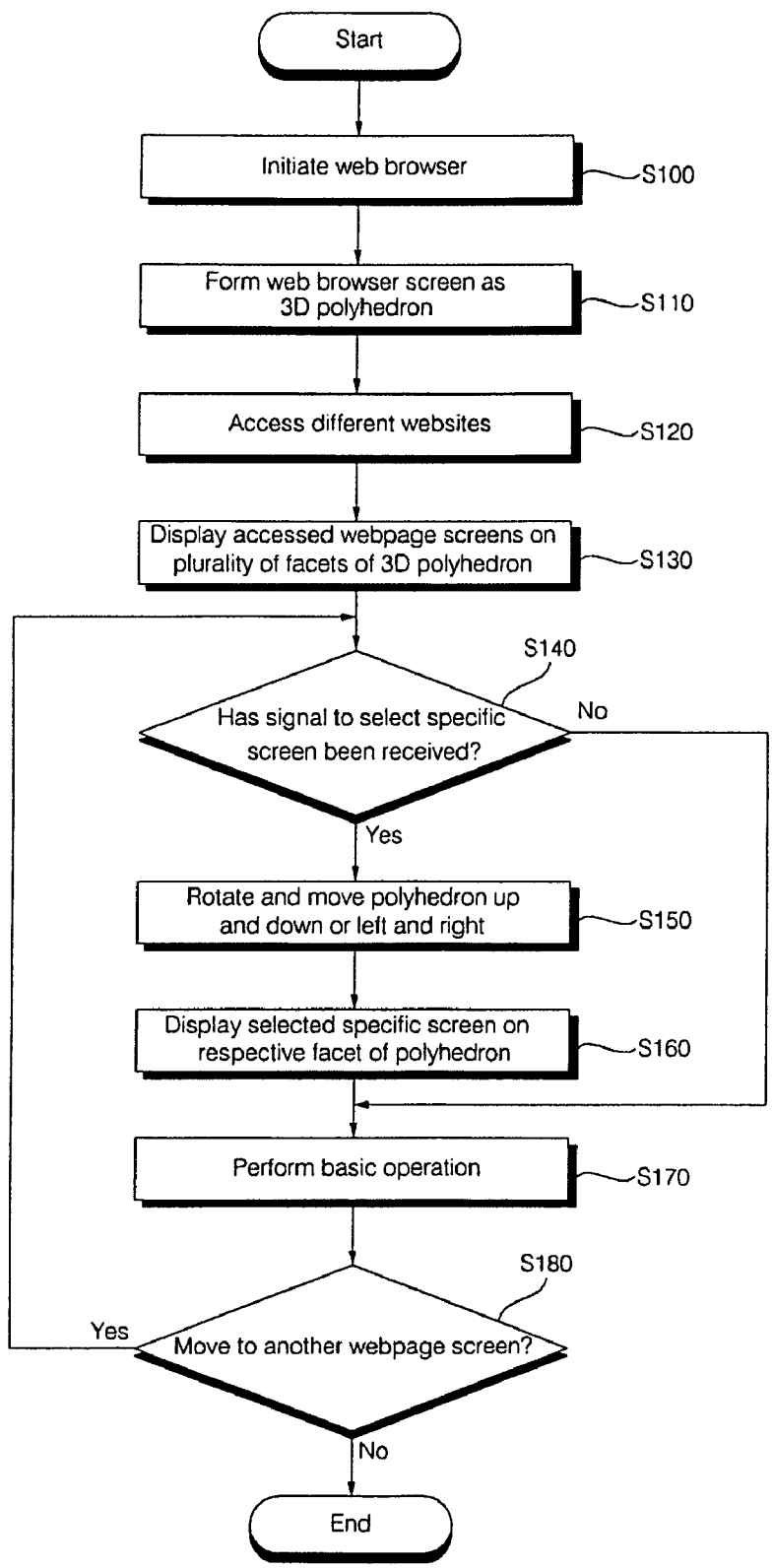
FIG. 2 is a flowchart illustrating an operation of a mobile communication terminal in accordance with an embodiment of the present invention.

Referring to FIG. 2, after a web browser is initiated (S100), the controller 10 controls a web browser screen to display a 3D polyhedron structure on the display unit 40 (S110). The controller 10 controls webpage screens, which are provided from different accessed websites, to display them on a plurality of facets of the 3D polyhedron structure (S120 and S130).

The controller 10 also controls a webpage screen to display when the webpage is selected and accessed through a specific facet of the polyhedron structure. The controller 10 converts the selected webpage screen on web browser screens of the 3D polyhedron structure into a 2D screen such that the 2D screen is displayed on the display unit 40. The controller 10 also controls the displayed 2D screen to perform a basic operation according to an applied command received from a user (S170).

If a control signal to select a specific webpage screen from the plurality of facets of the polyhedron structure is received (S140), the controller 10 controls the polyhedron structure to rotate and move up and down or left and right (S150) to display the selected specific webpage screen on the display unit 40 (S160). The control signal to select a specific webpage screen is received through manipulation of at least one of the direction key, the numeric key, and the tab key.

The controller 10 controls the accessed webpage screen to display the webpage screen while any one of the plurality of facets of the polyhedron structure is displayed on the display unit 40. Similarly, the controller 10 controls the accessed webpage to perform basic operation in response to an applied command from a user (S170). To move to another webpage screen located on another facet of the polyhedron structure (S180), the steps 'S140' to 'S170' are repeatedly performed.

In the above described embodiment of the present invention, a selected webpage screen was displayed while moving each facet of the polyhedron structure. In addition, accessed webpage screens may be displayed on their respective facets of the polyhedron structure by setting a website previously displayed on each facet such that a web browser accesses each website when executing the web browser.

Figure 3:
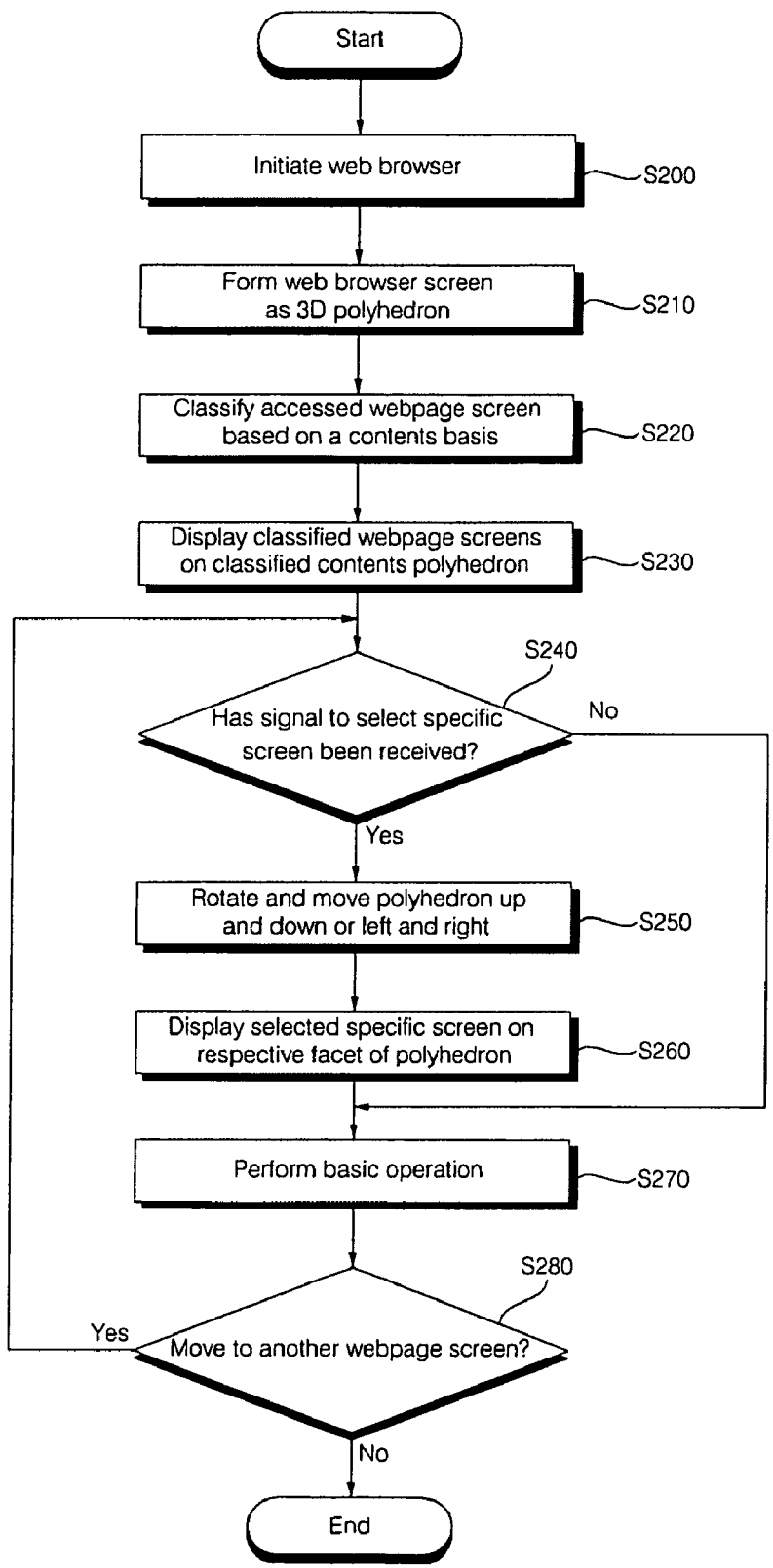
FIG. 3 is a flowchart illustrating an operation of a mobile communication terminal in accordance with an embodiment of the present invention.

Referring to FIG. 3, after a web browser is initiated (S200), the controller 10 controls a web browser screen to display a 3D polyhedron structure (S210). The controller 10 controls webpage screens, which are provided from accessed websites, to classify the webpage screens according to their contents (S220) such that the classified webpage screens are displayed on a plurality of facets of the 3D polyhedron structure (S230). When a contents screen displayed on any one of the plurality of facets of the polyhedron structure is selected, the controller 10 converts the web browser screen in the 3D polyhedrons structure into a 2D screen. The controller 10 controls the displayed 2D screen such that a basic operation is performed according to an applied command received from (S270).

If a control signal to select a specific contents screen from the plurality of facets of the polyhedron structure is received (S240), the controller 10 controls the polyhedron structure to rotate and move up and down or left and right (S250) such that the specific contents screen is displayed on a specific facet of the polyhedron structure (S260). The control signal to select the specific contents screen is received through manipulation of at least one of the direction key, the numeric key, and the tab key. The controller 10 controls the specific contents screen of the accessed webpage displayed on the specific facet of the polyhedron structure to perform a basic operation according to an applied command (S270).

To move to and display a web page displayed on another facet of the polyhedron structure (S280), the controller 10 controls the polyhedron structure to rotate and move up and down or left and right according to a received signal (S250). The controller 10 controls another contents screen of an accessed webpage to be displayed on the display unit 40 (S260).

Figure 4:
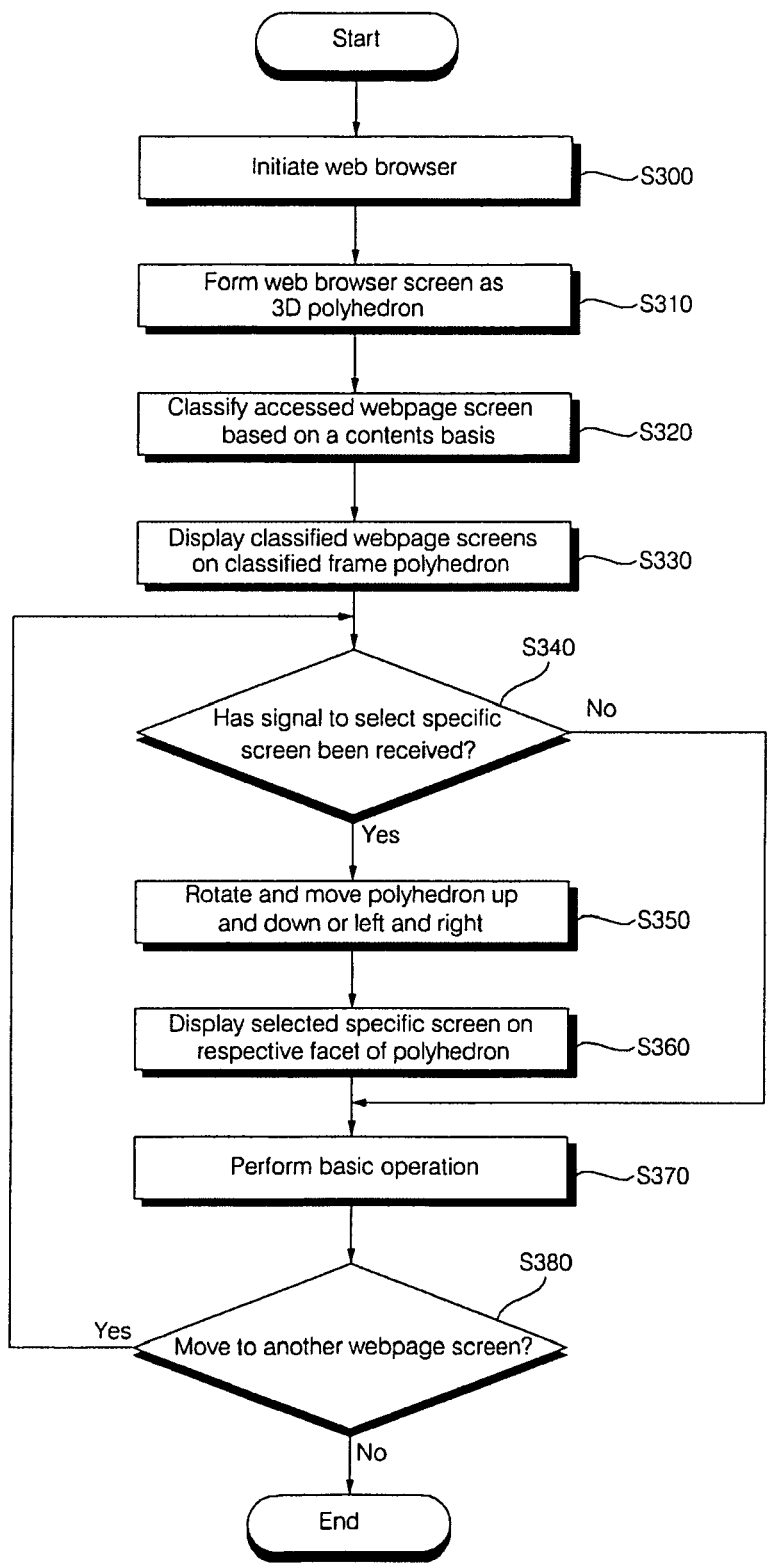
FIG. 4 is a flowchart illustrating an operation of a mobile communication terminal in accordance with an embodiment of the present invention.

Referring to FIG. 4, after a web browser is initiated (S300), the controller 10 controls a web browser screen to display a 3D polyhedron structure (S310). The controller 10 controls webpage screens, which are provided from accessed websites, to classify them based on a frame or section basis (S320) such that the classified webpage screens are displayed on a plurality of facets of the 3D polyhedron structure (S330). When a frame or section screen displayed on any one of the plurality of facets of the polyhedron structure is selected, the controller 10 converts the web browser screen in the 3D polyhedron structure into a 2D screen. The controller 10 controls the displayed 2D screen to perform a basic operation in response to an applied command (S370).

If a control signal to select a specific frame or section screen from the plurality of facets of the polyhedron structure is received (S340), the controller 10 controls the polyhedron structure to rotate and move up and down or left and right (S350) such that the specific frame or section screen is displayed on the display unit 40 (S360). The control signal to select the specific frame or section screen is received through manipulation of at least one of the direction key, the numeric key, and the tab key. The controller 10 controls the specific frame or section screen of the accessed webpage displayed on the specific facet of the polyhedron structure to perform a basic operation in response to an applied command (S370).

When any single facet is selected from the plurality of facets of the 3D polyhedron displaying different web browser screens, the controller 10 converts the selected single facet into a 2D screen. The controller 10 controls the selected facet displayed on the display unit 40 to perform a basic operation according to an applied command (S370). To move to another single facet of the polyhedron structure (S380), the controller 10 controls the polyhedron structure to rotate and move up and down or left and right according to a received signal (S350). The controller 10 controls another frame or section screen of the accessed webpage to be displayed on the display unit 40 (S360).

Figure 5A:
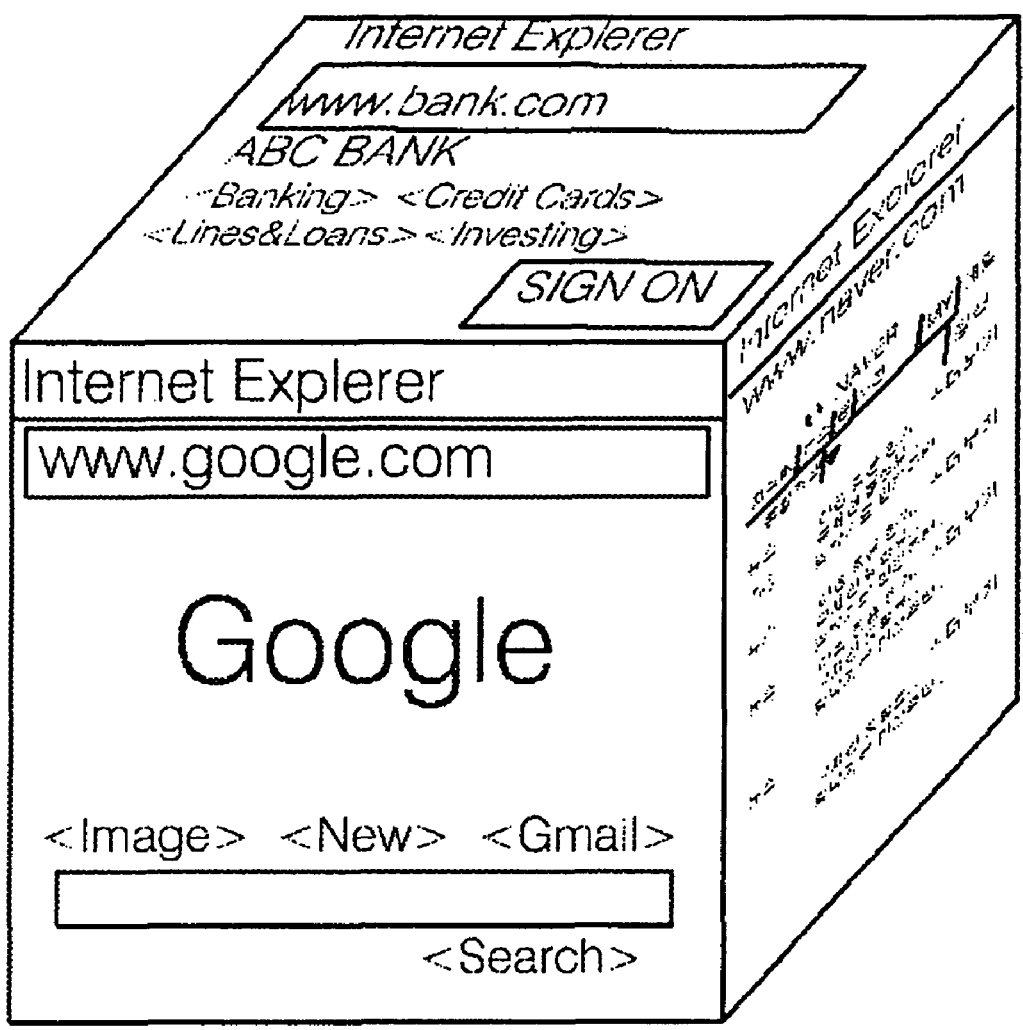
FIGS. 5 to 7 are views showing a method of displaying screen of the mobile communication terminal in accordance with an embodiment of the present invention.

FIG. 5A illustrates a web browser screen formed as a hexahedron structure. Webpage screens provided from different websites are displayed on a plurality of facets of the hexahedron structure. FIG. 5B is an unfolded view of the hexahedron structure shown in FIG. 5A.

Webpage screens of different websites displayed on a hexahedron structure shown in FIG. 5A, include, for example, Google (M1), Naver (M2), Stock (M3), Shopping (M4), Banking (M5), and Blog (M6). It is possible to access another website by moving the screen of the hexahedron structure while accessing any one of the websites displayed on the hexahedron structure.

Each of the websites displayed on the hexahedron structure is also displayed on a respective facet in an unfolded version of the polyhedron structure, as shown in FIG. 5B. Specifically, the facet where the Google webpage screen is displayed is a first facet M1, the facet where the Naver webpage screen is displayed is a second facet M2, the facet where the Stock webpage screen is displayed is a third facet M3, the facet where the Shopping webpage screen is displayed is a fourth facet M4, the facet where the Banking webpage screen is displayed is a fifth facet M5, and the facet where the Blog webpage screen is displayed is a sixth facet M6.

Figure 6:
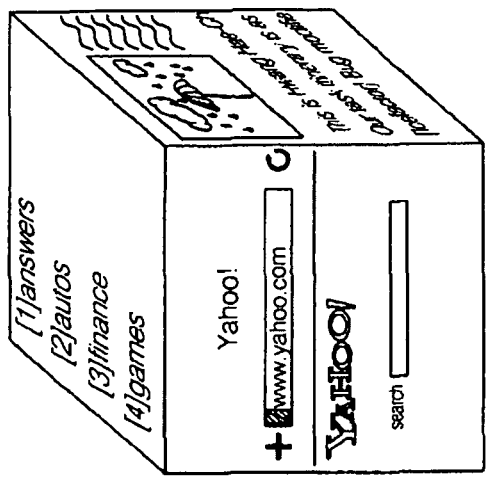
Figure 6:
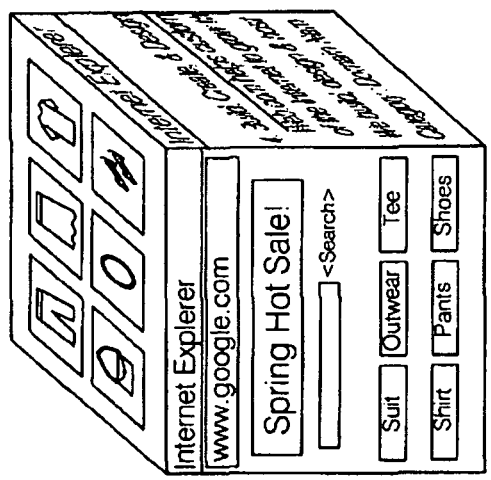
Figure 6:
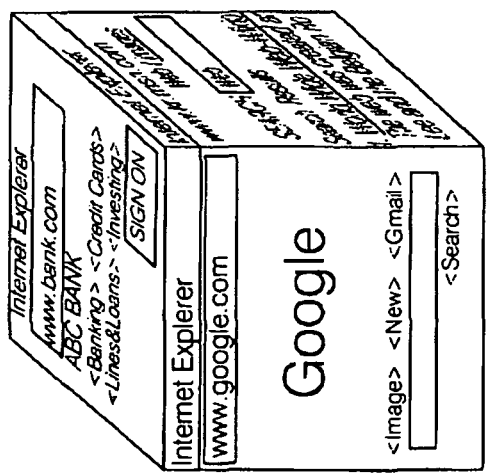

FIG. 6(a) illustrates that webpage screens provided from different websites are displayed on a plurality of facets of a hexahedron structure. However, the present invention is not limited thereto and the controller 10 may classify the webpage screens according to their contents, such as text, an image and flash, based on the programming sources of accessed webpages, as shown in FIG. 6(b).

The controller 10 controls the classified contents screens to display them on their respective facets of the hexahedron structure. The controller 10 also classifies the webpage screens according to frames or sections, as shown in FIG. 6(c). The frames or sections include a login region, a search word input region, a header region, and a data region based on the programming sources of accessed webpages. The controller 10 controls the classified frame or section screens to display them on a plurality of facets of the hexahedron structure. The controller 10 may also control screens, which are classified according to types, to display them on a plurality of facets of the hexahedron structure.

Figure 7:
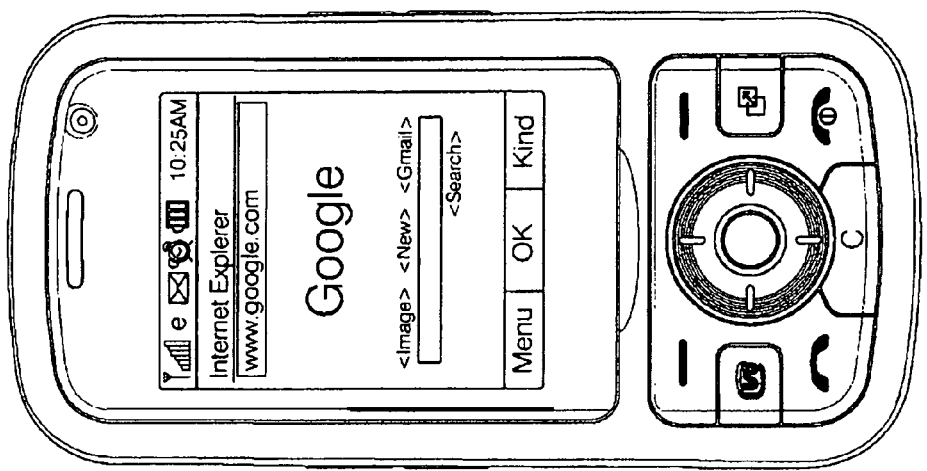
Figure 7:
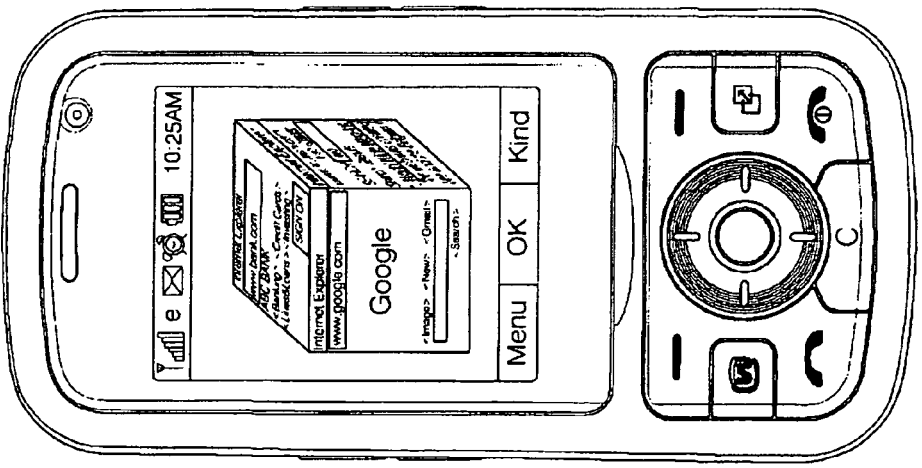

FIG. 7 is a view of the display unit 40 illustrating an operation of displaying web browser screens in a hexahedron structure shown in FIGS. 5A, 5B, and 6(a). Referring to FIG. 7(a), when a web browser is initiated, the controller 10 controls the web browser screen to form and display a hexahedron structure on the display unit 40.

Webpage screens provided from different websites are displayed on a plurality of facets of the hexahedron structure. When any one of the plurality of facets of the hexahedron structure is selected, for example, by selecting 'OK', the controller 10 controls a webpage screen accessed by selecting a specific facet of the hexahedron structure to display the accessed webpage on the display unit 40.

Referring to FIG. 7(b), the controller 10 controls the selected facet to be switched to a 2D screen according to an applied control command. It is also possible to go back from the 2D screen to the web browser screen in the hexahedron structure shown in FIG. 7(a) in response to a command.

Figure 8:
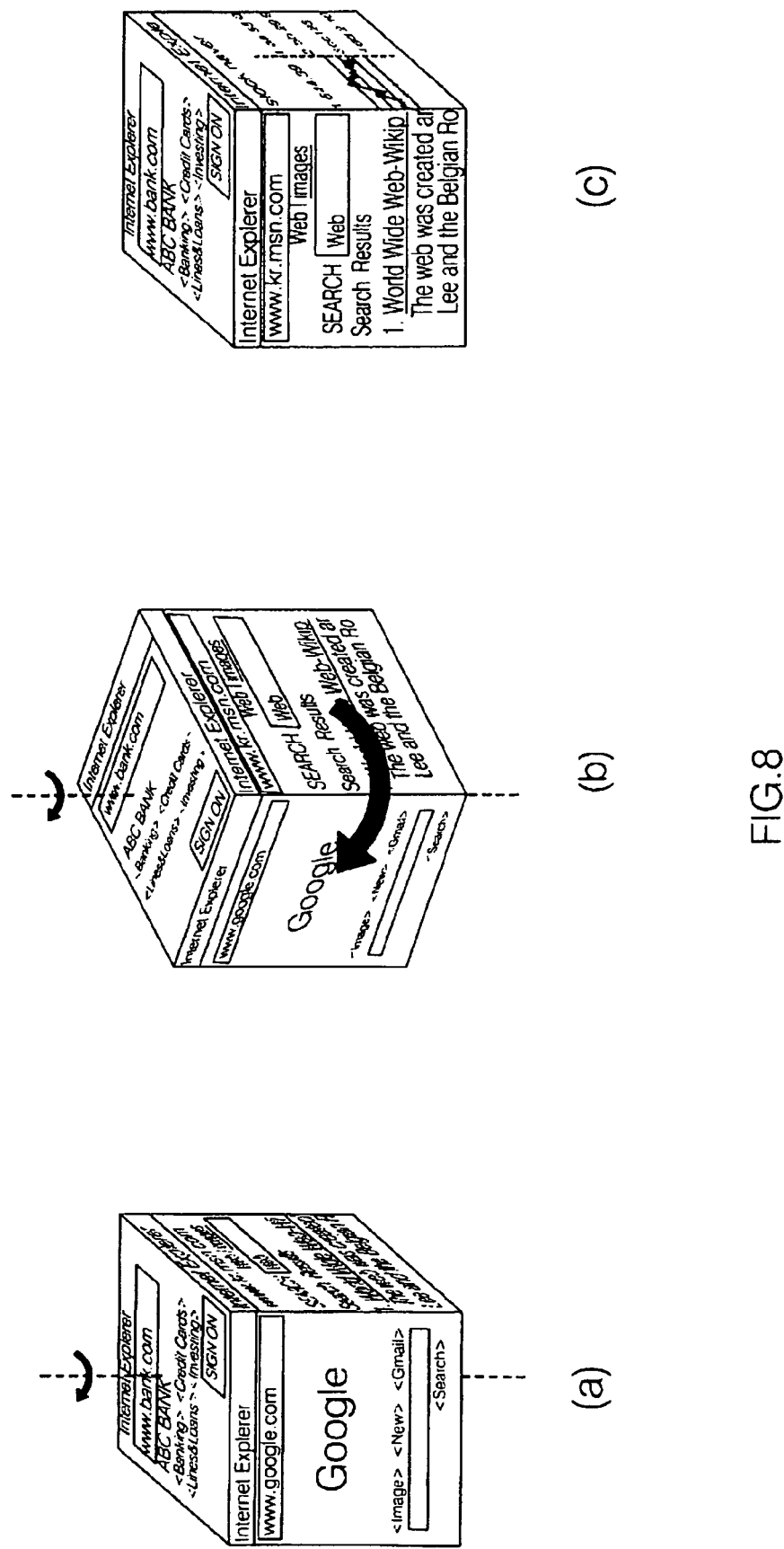
FIGS. 8 to 11 are views of a display screen showing a method of moving the screen of the mobile communication terminal in accordance with an embodiment of the present invention.

FIG. 8 is a diagram illustrating an operation of rotating and moving the displayed web browser screen of the hexahedron structure about a longitudinal axis on the display unit 40. Referring to FIG. 8(a), if a signal to select the second facet M2 of the hexahedron structure is received when the first facet M1 is displayed on the front surface of the hexahedron structure on the display unit 40, the controller 10 controls the hexahedron structure to rotate and move to the left about the longitudinal axis, as shown in FIG. 8(b). As shown in FIG. 8(c), the controller 10 controls the selected second facet M2 to display the webpage screen 'Naver' on the front surface of the hexahedron structure on the display unit 40. In other words, when any one of the four traverse sides, for example, the first facet M1, the second facet M2, the third facet M3, and the fourth facet M4, of the hexahedron structure is selected, the controller 10 controls the hexahedron structure to rotate and move about the longitudinal axis.

Figure 9:
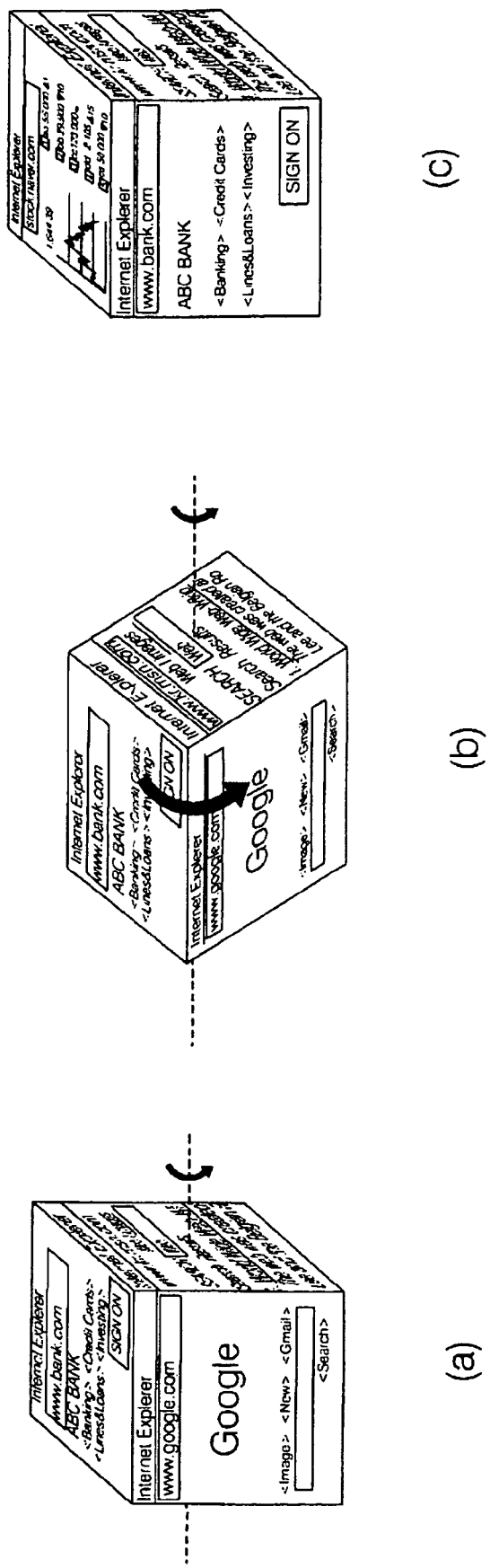

FIG. 9 is a diagram illustrating an operation of rotating and moving the web browser screen of the hexahedron structure about a traverse axis on the display unit 40. FIG. 9(*a*) shows that the first facet M1 is displayed on the front surface of the hexahedron structure on the display unit 40, as also shown in FIG. 8(*a*). If a signal to select the fifth facet M5 of the hexahedron structure is received, the controller 10 controls the hexahedron structure to rotate and move downward about the traverse axis, as shown in FIG. 9(*b*). As shown in FIG. 9(*c*), the controller 10 controls the selected fifth facet M5 to display the webpage screen 'Banking' on the front surface of the hexahedron structure on the display unit 40. In other words, when any one of the four longitudinal sides, for example, the first facet M1, the third facet M3, the fifth facet M5, and the sixth facet M6, of the hexahedron structure is selected, the controller 10 controls the hexahedron structure to rotate and move about the traverse axis.

When the first facet M1 or the third facet M3 of the hexahedron structure is selected, the hexahedron structure can be rotated and moved about the longitudinal axis or the traverse axis. Therefore, a priority may be determined between the longitudinal axis and the traverse axis according to a setting. In other words, if a priority of the traverse axis is set higher than a priority of the longitudinal axis, when a signal to select the third facet M3 is received, the hexahedron structure is rotated and moved about the traverse axis, and thus, the third facet M3 is displayed on the front surface of the hexahedron structure on the display unit 40. Alternatively, if the longitudinal axis is set to have a higher priority than the traverse axis, the hexahedron structure is rotated and moved about the longitudinal axis.

Figure 10:
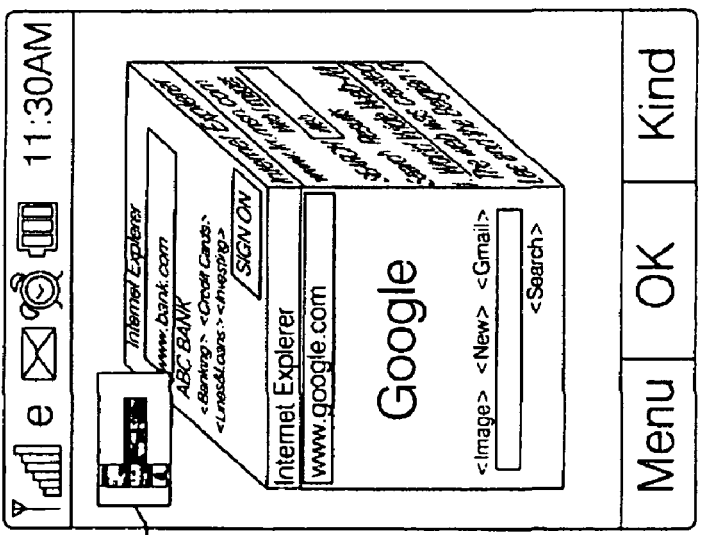
Figure 10:
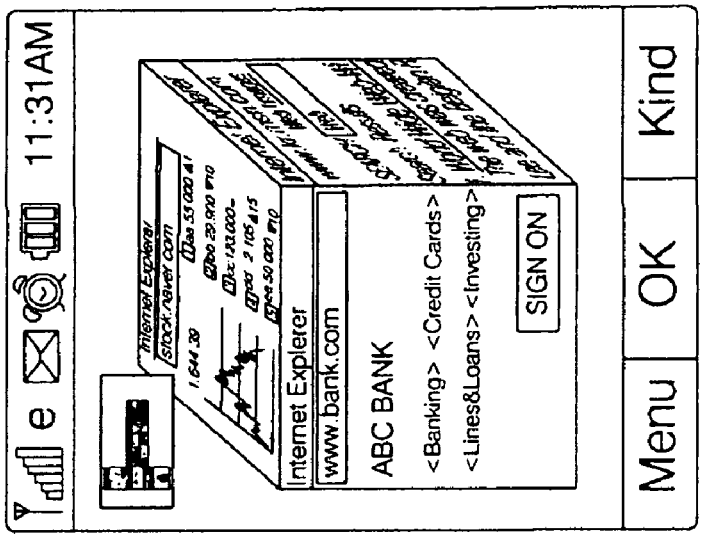

FIG. 10 is a view of the display unit 40 illustrating a method of selecting a facet from a plurality of facets of the hexahedron structure displayed on the screen with reference to FIGS. 8 and 9. A facet of the hexahedron may be selected in various ways. Any one of the plurality of facets of the hexahedron structure may be selected through key manipulation. The manipulated key may be any one of the numeric key, the direction key and the tab key included in the key input unit 30.

The controller 10 controls an unfolded version of the hexahedron structure 510 to be displayed on a specific region of the display unit 40. The unfolded version of the hexahedron structure 510 allows a user to see information regarding all facets of the hexahedron structure at a glance. Accordingly, if any one of the numeric key, the direction key, and the tab key is manipulated according to information displayed on the unfolded version of the hexahedron structure 510, the controller 10 controls the hexahedron structure to rotate and move up and down or left and right such that a specific facet corresponding to the manipulated key is displayed on the front surface of the hexahedron structure on the display unit 40.

The controller 10 may set and assign page numbers from '1' to '6' to each of the plurality of facets of the hexahedron structure in order to display a screen in response to the manipulation of the numeric key. The controller 10 controls a selected facet, having a page number corresponding to the manipulated numeric key, to be displayed on the front surface of the hexahedron structure on the display unit 40.

In other words, if the sixth facet M6 is selected by manipulating the numeric key '5' or the direction keys '↓' when the first facet M1 of the hexahedron structure is displayed on the front surface of the display unit 40 as shown in FIG. 10(*a*), the controller 10 controls the hexahedron structure to rotate and move such that the sixth facet M6 is displayed on the front surface of the hexahedron structure on the display unit, as shown in FIG. 10(*b*). Alternatively, in order to display a screen corresponding to the manipulated tab key, the controller 10 may assign priorities of from '1' to '6' to the respective facets of the hexahedron structure such that the respective facets of the hexahedron structure are rotated and moved according to the priorities assigned to the respective facets of the hexahedron structure whenever the tab key is manipulated.

Figure 11:
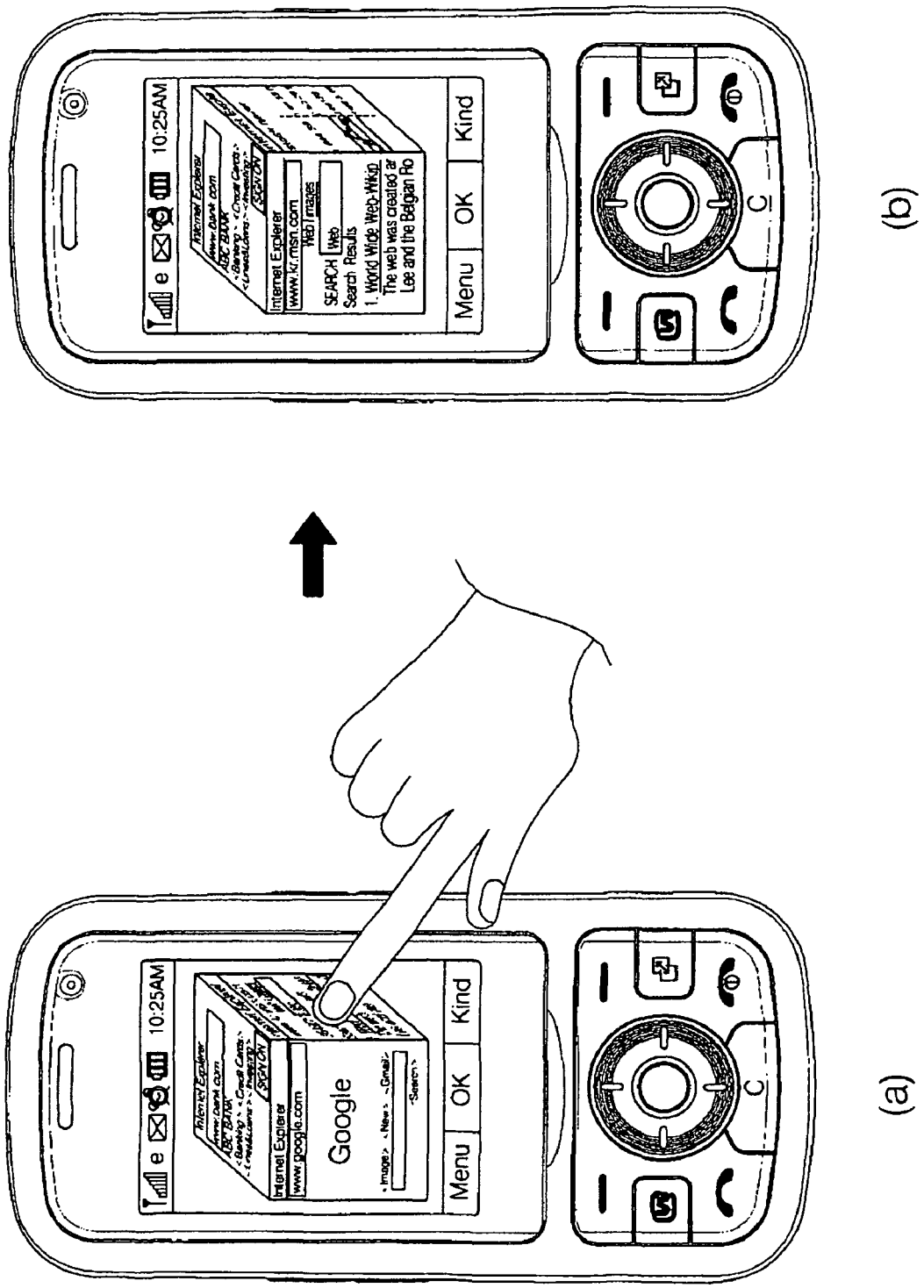

FIG. 11 is a diagram illustrating an embodiment of the present invention in which the display unit 40 is comprised of a touch screen. In FIG. 11, the hexahedron structure is rotated and moved in response to a signal sensed through the touch screen. In other words, if the second facet M2 is selected through the touch screen when the first facet M1 of the hexahedron structure is displayed on the front surface of hexahedron structure on the display unit 40, the controller 10 controls the hexahedron structure to rotate and move about the longitudinal axis such that the second facet M2 is displayed on the front surface of the hexahedron structure on the display unit 40.

Figure 12:
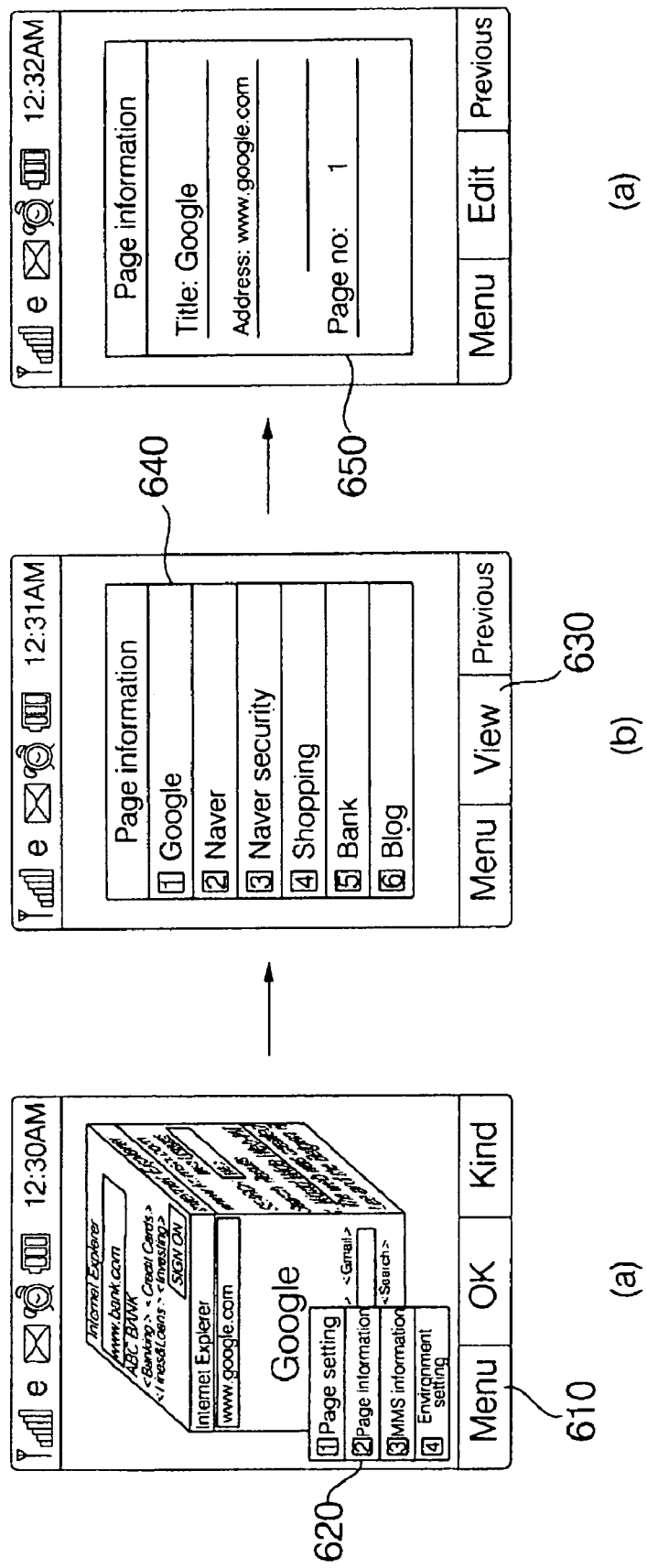
FIGS. 12 and 13 are views of a display screen showing a method of displaying screen information of the mobile communication terminal in accordance with an embodiment of the present invention.

FIG. 12 is a diagram illustrating an operation of displaying webpage information accessed through a specific facet of the hexahedron structure by manipulating menu items. If an item 'Page information 620' in a menu list is selected by manipulating a menu button 'menu 610' as shown in FIG. 12(*a*), the controller 10 controls the webpage information accessed through the specific facet of the hexahedron structure to be displayed as a list, as shown in FIG. 12(*b*). When one of displayed webpage information, for example '1. Google 640', is selected from the "Page information" list and a menu button 'View 630' is manipulated, the controller 10 controls detailed information 650 of the selected 'Google' page to be displayed. As a result, a user can view the webpage information accessed through the specific facet of the hexahedron structure.

Alternatively, the webpage information accessed through the specific facet of the hexahedron structure may be seen not only through an additional menu, but also through an unfolded view of the hexahedron structure 510 displayed on a specific region of the display unit 40, as shown in FIG. 10. Accordingly, through the list of facet information 640 or the unfolded view of the hexahedron structure 510, a user is able to see information about all facets of the hexahedron structure, including the facets which were not viewable from a current perspective view.

Figure 13:
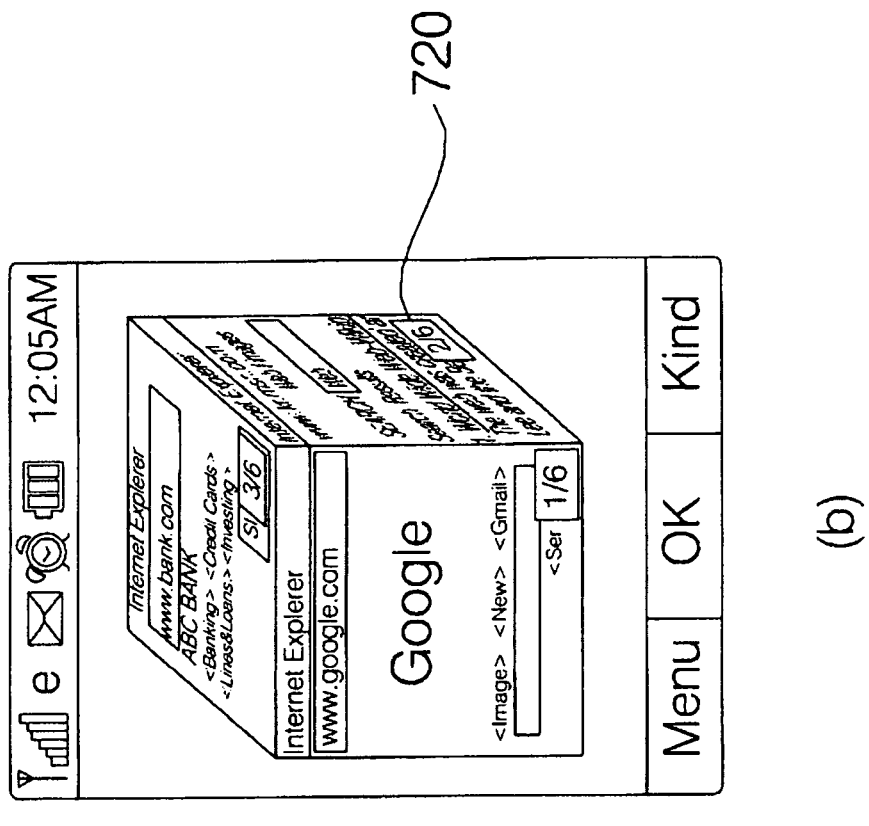
Figure 13:
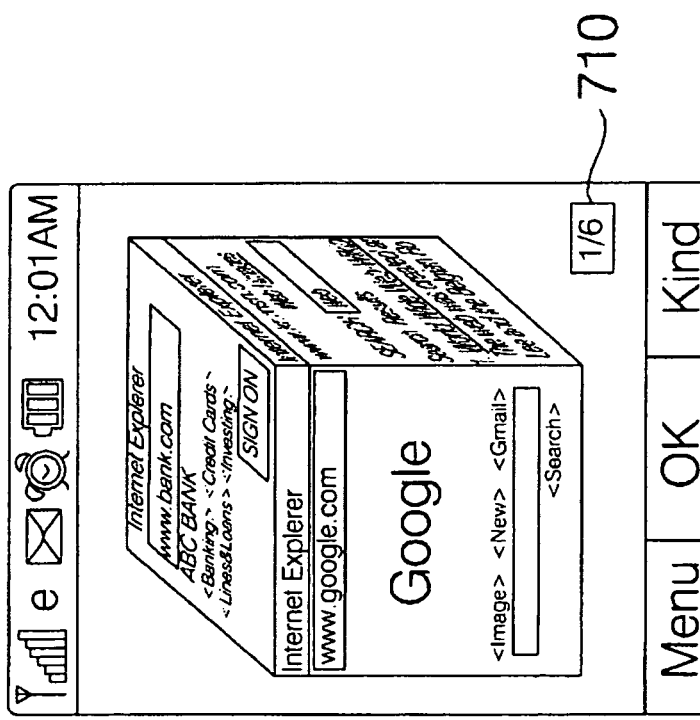

FIG. 13 is a view of the display unit 40 illustrating an operation of displaying a page number, a priority, and the like, which are set in a plurality of facets of the hexahedron structure when the web browser screen of the hexahedron structure is displayed on the display unit while executing the web browser. FIG. 13(*a*) shows that page information 710 of a screen displayed on the front surface of the hexahedron structure is displayed outside the hexahedron structure and at a region on the display unit 40. FIG. 13(*b*) shows that page information 720 set to each facet of the hexahedron structure is displayed in each respective facet of the hexahedron structure. Alternatively, instead of displaying the page number set to each facet of the hexahedron structure, a priority or other information related to each page of the hexahedron structure may be displayed.

In the above described embodiments of the present invention, the web browser screen of the 3D polyhedron is formed as the hexahedron structure. However, the web browser screen may also be implemented in various forms including a structure such as a trigonal pyramid and a circular cylinder.

As described above, according to the present invention, since a web browser screen is formed as a 3D polyhedron structure, a user is provided with a plurality of webpage screens. Further, since different webpage screens are displayed on a plurality of facets of the polyhedron structure, the user may access a desired webpage screen easily without going through redundant steps.

The above-described methods can be implemented using a controller or processor in conjunction with computer-readable codes stored in a computer-readable medium. The computer-readable media include flash memory, ROM, RAM, optical data storage devices, etc. The computer-readable codes may be received from an external source such as Internet, an external server, or other wireless communication system.

While the invention has been described in connection with the mobile communication terminal and the method of controlling a webpage thereof with reference to the illustrated drawings, the foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of controlling display information in a wireless mobile terminal, the method comprising:
    displaying a polyhedron structure on a display of the mobile terminal, wherein the polyhedron structure comprises a plurality of facets, each facet configured to display content obtained from remote servers, and wherein each facet of the polyhedron structure is assigned a corresponding number and each facet is selectable by receiving a number corresponding to each facet;
    receiving a first external user input;
    displaying a total number of the plurality of facets and the number corresponding to the selected facet at a designated portion of the display that is outside the polyhedron structure;
    rotating the polyhedron structure in a direction associated with the first external user input to display a different one of the plurality of facets of the polyhedron structure;
    accessing a web site via one of the remote servers and displaying content obtained from the accessed web site on the different one of the plurality of facets; and
    setting the accessed web site as a web site for the different one of the plurality of facets such that content obtained from the set web site is displayed on the different one of the plurality of facets after launching the polyhedron structure,
    wherein a plurality of web sites that were previously displayed on corresponding facets are set as web sites to be displayed on corresponding facets when the polyhedron structure is launched and initially displayed on the display.

2. The method of claim 1, further comprising:
    receiving a second external user input;
    stopping displaying of the polyhedron structure and displaying, on the display, content associated with one of the plurality of facets in response to the second external user input;
    receiving a third external user input while the content associated with the one of the plurality of facets is displayed on the display; and
    resuming displaying of the polyhedron structure in response to the third external user input.

3. The method of claim 1, wherein the polyhedron structure is launched and displayed in response to an input for initiating a web browser.

4. The method of claim 3, wherein locations of the web sites with respect to the plurality of facets of the polyhedron structure are determined based on frequency of web site visits or user defined.

5. The method of claim 1, wherein the plurality of facets display contents based on an information type.

6. The method of claim 1, wherein the plurality of facets display contents from different sections of the same web page.

7. The method of claim 1, wherein the plurality of facets display corresponding numbers on each of the plurality of facets and a facet is selected from the plurality of facets in response to a fourth external user input that comprises selecting a number corresponding to the facet.

8. The method of claim 1, further comprising:
    displaying an unfolded view of the polyhedron structure to display contents from all facets of the polyhedron,
    wherein the unfolded view of the polyhedron structure is displayed at a designated portion of the display concurrently with the polyhedron structure.

9. The method of claim 1, wherein the first external user input is recognized using a touch screen.

10. The method of claim 1, further comprising:
    displaying a facet information list associated with content displayed on all facets to provide information about facets not viewable from a current perspective view,
    wherein the facet information list is independent of the polyhedron structure.

11. The method of claim 10, wherein each item of the facet information list is alterable by a user.

12. A mobile terminal for controlling display information, the mobile terminal comprising:
    a display unit configured to display information;
    a controller configured to control a display to display a polyhedron structure, wherein the polyhedron structure comprises a plurality of facets, each facet configured to display content obtained from remote servers, and wherein each facet of the polyhedron structure is assigned a corresponding number and each facet is selectable by receiving a number corresponding to each facet; and
    an external input interface operatively connected to the controller to recognize a user input,
    wherein the controller is further configured to:
    control the display to display a total number of the plurality of facets and the number corresponding to the selected facet at a designated portion of the display that is outside the polyhedron structure;
    rotate the polyhedron structure in a direction associated with a first user input received and recognized by the external input interface to display a different facet of the polyhedron structure;

access a web site via one of the remote servers and control the display to display content obtained from the accessed web site on the different one of the plurality of facets; and set the accessed web site as a web site for the different one of the plurality of facets such that content obtained from the set web site is displayed on the different one of the plurality of facets after launching the polyhedron structure, wherein a plurality of web sites that were previously displayed on corresponding facets are set as web sites to be displayed on corresponding facets when the polyhedron structure is launched and initially displayed on the display.

13. The mobile terminal of claim 12, wherein the controller is further configured to:

stop displaying of the polyhedron structure and display content associated with one of the plurality of facets in response to a second user input received and recognized by the external input interface and; and resume displaying of the polyhedron structure in response to a third user input received while the content associated with the one of the plurality of facets is displayed on the display and recognized by the external input interface.

14. The mobile terminal of claim 12, wherein the controller launches the polyhedron structure and control the display to display the polyhedron structure in response to an input for initiating a web browser.

15. The mobile terminal of claim 12, wherein the controller is further configured to control the display to display on the plurality of facets contents based on an information type.

16. The mobile terminal of claim 12, wherein the controller is further configured to control the display to display on the plurality of facets contents from different sections of the same web page.

17. The mobile terminal of claim 12, wherein the controller is further configured to control the display to display numbers corresponding to the plurality of facets on each of the plurality of facets, and a facet is selected from the plurality of facets in response to a fourth user input that comprises selecting a number corresponding to the facet.

18. The mobile terminal of claim 12, wherein the controller is further configured to control the display to display an unfolded view of the polyhedron structure to display contents from all facets of the polyhedron, and wherein the unfolded view of the polyhedron structure is displayed concurrently with the polyhedron structure at a designated portion of the display.

19. The mobile terminal of claim 12, wherein the first user input is recognized using a touch screen.

20. The mobile terminal of claim 19, wherein locations of the web sites with respect to the plurality of facets of the polyhedron structure are determined based on frequency of web site visits or user defined.

21. The mobile terminal of claim 12, wherein the controller is further configured to control the display to display a facet information list associated with content displayed on all facets to provide information about facets not viewable from a current perspective view, wherein the facet information list is independent of the polyhedron structure.

22. The mobile terminal of claim 12, wherein each item of the facet information list is alterable by a user.

* * * * *